(12) United States Patent
Crespo Montero

(10) Patent No.: US 11,044,926 B2
(45) Date of Patent: Jun. 29, 2021

(54) FLAVOURING COMPOSITION FOR ANIMAL FEED

(71) Applicant: INTERQUIM, S.A., Sant Cugat del Vallès (ES)

(72) Inventor: Francisco Javier Crespo Montero, Sant Cugat del Vallès (ES)

(73) Assignee: HEALTHTECH BIO ACTIVES, S.L.U., Barcelona (ES)

( * ) Notice: Subject to any disclaimer, the term of this patent is extended or adjusted under 35 U.S.C. 154(b) by 373 days.

(21) Appl. No.: 15/564,947

(22) PCT Filed: Apr. 19, 2016

(86) PCT No.: PCT/EP2016/058601
§ 371 (c)(1),
(2) Date: Oct. 6, 2017

(87) PCT Pub. No.: WO2016/169905
PCT Pub. Date: Oct. 27, 2016

(65) Prior Publication Data
US 2018/0103660 A1    Apr. 19, 2018

(30) Foreign Application Priority Data

Apr. 20, 2015 (EP) .................................. 15164168

(51) Int. Cl.
*A23K 50/30* (2016.01)
*A23K 50/60* (2016.01)
*A23K 20/00* (2016.01)
*A23K 20/105* (2016.01)
*A23L 27/20* (2016.01)

(52) U.S. Cl.
CPC .............. *A23K 50/30* (2016.05); *A23K 20/00* (2016.05); *A23K 20/105* (2016.05); *A23K 50/60* (2016.05); *A23L 27/2024* (2016.08); *A23L 27/2028* (2016.08)

(58) Field of Classification Search
CPC ........ A23K 50/30; A23K 50/60; A23K 20/00; A23K 20/105; A23L 27/2024; A23L 27/2028
USPC ........................................................ 426/534
See application file for complete search history.

(56) References Cited

U.S. PATENT DOCUMENTS 4,125,629 A    11/1978    Rossi

FOREIGN PATENT DOCUMENTS

| JP | 10-146156 A | 6/1998 |
| WO | WO 2005/079606 A1 | 9/2005 |
| WO | WO 2009/068622 A1 | 6/2009 |

OTHER PUBLICATIONS

"Pig Flavor Extra 792", Agri-Flavors Inc., http://web.archive.org/web/20091116231758/http://agriflavors.com/sitebuildercontent/sitebuilderfiles/pigflavorextra792.pdf/, captured on Nov. 16, 2009 (Year: 2009).*
Adeleye et al., "Exploratory behaviour and performance of piglets fed novel flavoured creep in two housing systems," Animal Feed Science and Technology, vol. 191, 2014, pp. 91-97.
Di Cagno et al., "Characterization of Italian Cheeses Ripened Under Nonconventional Conditions," Journal of Dairy Science, vol. 90, 2007, pp. 2689-2704.
Di Cagno et al., "Effect of autochthonous lactic acid bacteria starters on health-promoting and sensory properties of tomato juices," International Journal of Food Microbiology, vol. 128, 2009, pp. 473-483.
Georgilopoulos et al., "Aroma compounds of fresh blackberries (*Rubus laciniata* L.)," Zeitschrift für Lebensmittel-Untersuchung und -Forschung, vol. 184, 1987, pp. 374-380.
Habu et al., "Volatile Components of Rooibos Tea (*Aspalathus linearis*)," Journal of Agricultural Food Chemistry, vol. 33, 1985, pp. 249-254.
International Search Report and Written Opinion of the International Searching Authority (Forms PCT/ISA/237 and PCT/ISA/210) issued in International Application No. PCT/EP2016/058601 dated Jul. 20, 2016.
Lorenzo et al., "Changes on Physico-chemical, Textural, Proteolysis, Lipolysis and Volatile Compounds During the Manufacture of Dry-cured 'Lacón' from Celta Pig Breed," Journal of Biological Sciences, vol. 13, No. 4, 2013, pp. 168-182.
Macleod et al., "Effect of Water on the Production of Cooked Beef Aroma Compounds," Journal of Food Science, vol. 52, No. 1, 1987, pp. 42-45.
Ruiz et al., "New Device for Direct Extraction of Volatiles in Solid Samples Using SPME," Journal of Agricultural Food Chemistry, vol. 49, 2001, pp. 5115-5121.
Spilsbury et al., "Piglet Survival in Early Lactation: A Review," Journal of Animal and Veterinary Advances, vol. 6, No. 1, 2007, pp. 76-86.
Sulabo et al., "Influence of feed flavors and nursery diet complexity on preweaning and nursery pig performance," Journal of Animal Science, vol. 88, 2010, pp. 3918-3926.
Wang et al., "Comparative effects of sodium butyrate and flavors on feed intake of lactating sows and growth performance of piglets," Animal Science Journal, vol. 85, 2014, pp. 683-689.
Yan et al., "Creep Feed: Effects of Feed Flavor Supplementation on Pre- and Post-weaning Performance and Behavior of Piglet and Sow," The Asian-Australasian Journal of Animal Science, vol. 24, No. 6, Jun. 2011, pp. 851-856.

* cited by examiner

*Primary Examiner* — Jeffrey P Mornhinweg
(74) *Attorney, Agent, or Firm* — Birch, Stewart, Kolasch & Birch, LLP

(57) ABSTRACT

The present invention relates to a flavour composition for animal feed comprising a mixture of esters, ketones and aldehydes. The invention also relates to liquid and solid flavouring compositions containing this flavouring mixture, to an animal feed containing this flavouring mixture and to its use as an additive for creep feed diets, especially for suckling swine and cattle.

5 Claims, No Drawings

FLAVOURING COMPOSITION FOR ANIMAL FEED

TECHNICAL FIELD

The present invention relates to a flavouring composition to be used as an additive for animal feed, especially for creep feeding diets of young livestock during the lactating period, to improve the performance of the animals at weaning.

BACKGROUND ART

The practice of supplementing the diet of young livestock with solid feed while they are still in the lactating period is known as creep feeding and it is aimed to improve the animal's performance, namely by increasing their growth rate and reducing offspring mortality, for example. Creep feeding is a common practice especially in swine and cattle livestock farming.

In particular, creep feeding of cattle is a useful alternative to supply all the nutrients required by the growing calf, which cannot be furnished by the milk from the lactating beef cow alone, especially when the pasture is inadequate or unavailable.

In swine farms, piglet death during the lactation period is one of the main causes of reduced production efficiency, and it is estimated that pre-weaning piglet mortality ranges from about 12 to 25%, depending on the housing system, according to several published studies.

Among the recognized causes of piglet mortality is lactational failure and starvation, so malnourishment of the piglets may be directly responsible for between 6 and 17% of all pre-weaning mortality in pig farms, as disclosed, for example, in the article Alonso-Spilsbury et al. *Piglet survival in early lactation: a review*, J. Anim. Vet. Adv., 2007, 6 (1), 76-86. Therefore, creep feeding of the suckling piglets is generally regarded as an efficient approach for improving the survival of piglets in pig farms, thus enhancing their productivity.

However, the intake of creep feed by young livestock is generally low, so the addition of several flavours to it has been disclosed in the state of the art as a strategy to improve diet acceptance and stimulate feed consumption, though the results obtained so far have not been completely satisfactory.

Thus, in the article Sulabo et al. *Influence of feed flavours and nursery diet complexity on preweaning and nursery pig permormance*, J. Anim. Sci., 2010, 88, 3918-3926, a study was designed to evaluate the effect of adding a commercial flavour to the creep diet of lactating piglets, and it was concluded that the addition of the flavour did not affect litter creep feed intake, the proportion of piglets consuming creep feed or the pre-weaning performance.

In the article Yan et al. *Creep feed: effects of feed flavor supplementation on pre-and post-weaning performance and behaviour of piglet sow*, Asian-Aust. J. Anim. Sci., 2011, 24 (6), 851-856, the results are reported of a study conducted to evaluate the effects of two flavour additives, namely a vanilla-flavoured supplement and a cheese-flavoured supplement, and it was concluded that the addition of those flavours to the creep feed improved post-weaning average daily gain (ADG) and gain/feed (G/F) ratio, but no difference was detected for the pre-weaning performance.

In the article Adeleye et al. *Exploratory behaviour and performance of piglets fed novel flavoured creep in two housing systems*, Anim. Feed Sci. Technol., 2014, 191, 91-97, a study is described where suckling piglets were fed with 5 different flavoured creeps (toffee, apricot, butterscotch, apple and red fruit) in a daily sequential order, comparatively with a control feed without flavour, and it was found that the flavoured feed increased the piglets feed intake, but it did not lead to an increased pre-weaning weight gain, although the growth was improved after weaning for the piglets who had consumed flavoured feed pre-weaning.

Glesni Mac Leod et al., Journal of Food Science 52, 1987, 42-45 discuss the effect of water on the production of cooked beef aroma compounds. Numeroud volatile components are disclosed.

J. M. Lorenzo et al., Journal of Biological Sciences 13(4): 168-182, 2013, report on changes on physico-chemical, textural, proteolysis, lipolysis and volatile compounds during the manufacture of dry-cured "lacón" from celta pig breed.

Ruiz Jorge et al., J. Agric. Food Chem. 2010, 49, 5115-5121 report on a new device for direct extraction of volatiles in solid samples using solid-phase microextraction.

D. N. Georgilopoulos et al., Z Lebensm Unters Forch (1987) 184: 374-380, report on the effect of autochthonous lactic acid bacteria starters on health-promoting and sensory properties of tomato juices.

R. Di Cagno et al., J. Dairy Sci. 90: 2689-2704, report on the characterization of Italian cheeses ripened under non-conventional conditions.

T. Habu et al., J. Agric. Food Chem. 1985, 33, 249-254, report on volatile components of rooibos tea.

Several flavouring compositions for feedstuffs have been disclosed in the prior art, especially designed for the diets of young animals in the suckling or in the weaning period, in an aim to improve feed acceptance.

Thus, for example, in the U.S. Pat. No. 4,125,629 it is disclosed the use of flavouring compositions comprising 30-50 wt. % of aldehydes, 25-35 wt. % of alcohols, 3-7 wt. % of esters and 20-30 wt. % of terpene derivatives. It is disclosed a process for increasing the growth rate of piglets during the weaning period which comprises feeding first the pregnant and subsequently lactating sow with a feedstuff aromatized by such flavouring composition and afterwards creep feeding the suckling piglets born to the said sow with a feed aromatized with the same flavouring composition.

In the Japanese patent application JP10146156-A it is disclosed the preparation of a palatable feed for piglets by spraying a 10% propylene glycol solution of a peach flavour onto pellet feed. Said peach flavour comprises ethyl n-butyrate, gamma-nonalactone, 2-methyl-3-butene, gamma-undecalactone, benzaldehyde, maltol, isocratic acid and a diluent or filler.

In the international patent application WO2009/068622-A1 it is disclosed a flavouring composition for piglet creep feed comprising propylene glycol, vanillin, gamma-nonalactone, isoamyl acetate, orange essential oil, ethyl benzoate, methyl cinnamate, benzyl butyrate, isoamyl butyrate and ethyl butyrate. It was observed that piglets showed a greater preference towards the food containing the flavour in relation to a control feed without flavour.

Despite the various flavouring compositions disclosed in the prior art, there is still the need of a flavouring composition suitable to be added to animal feed, particularly to pig and cattle feed, and more particularly to creep feed, to not only stimulate solid feed intake by the lactating animals, but also to effectively improve the animal's performance at weaning in terms of increased growth rate and body weight, diminished mortality and/or weight homogeneity of the litter, for example.

OBJECT OF THE INVENTION

The object of the present invention is a flavouring mixture.

A second aspect of the present invention is a liquid flavouring composition consisting of the flavouring mixture and a solvent.

A third aspect of the invention is a solid flavouring composition comprising the flavouring mixture and an inert solid carrier.

A fourth aspect of the invention is an animal feed comprising the flavouring mixture.

A fifth aspect of the invention is the use of the flavouring mixture for flavouring animal feed compositions.

DETAILED DESCRIPTION OF THE INVENTION

In a first aspect, the present invention relates to a flavouring mixture comprising (or consisting of):
 a) two or three esters of formula $R_1$—COO—$R_2$;
 b) two or three ketones of formula $R_3$—CO—$R_4$; and
 c) two or three aldehydes of formula $R_5$—CHO;
wherein $R_1$, $R_3$, and $R_4$ are $C_{1-5}$ linear alkyl groups; $R_2$ is a $C_{1-5}$ linear or branched alkyl group; and $R_5$ is a $C_{2-9}$ linear alkyl group.

The authors of the present invention have developed a new flavouring mixture, based on the specific combination of several fragrant esters, ketones and aldehydes, that, surprisingly, when used as flavouring additive for animal feed, especially as a flavour for swine and cattle creep feed, has remarkable effects on the development and overall performance of the young lactating animals.

As used herein, the term $C_{1-5}$ linear alkyl group means a straight alkyl chain which contains from 1 to 5 carbon atoms and includes the groups methyl, ethyl, n-propyl, n-butyl, and n-pentyl; the term $C_{1-5}$ linear or branched alkyl group means a straight or branched alkyl chain which contains from 1 to 5 carbon atoms and includes, among others, the groups methyl, ethyl, n-propyl, isopropyl, n-butyl, isobutyl, sec-butyl, tert-butyl, n-pentyl or isopentyl; and the term $C_{2-9}$ linear alkyl group means a straight alkyl chain which contains from 2 to 9 carbon atoms and includes the groups ethyl, n-propyl, n-butyl, n-pentyl, n-hexyl, n-heptyl, n-octyl, and n-nonyl.

As used herein, the terms "comprise" "comprises" "comprising" "include", "includes", and "including" are meant to be non-limiting, i.e., they are used to specify the presence of the stated components but do not preclude the presence of additional components, unless the contrary is specifically stated. These terms also include the term "consisting essentially of" or "consisting of".

Unless indicated otherwise, the percentages (%) used in the present description refer to weight percentages (weight/weight, w/w).

Flavouring Mixture

Esters

The flavouring mixture according to the present invention comprises two or three esters of formula $R_1$—COO—$R_2$, wherein $R_1$ is a $C_{1-5}$ linear alkyl group and $R_2$ is a $C_{1-5}$ linear or branched alkyl group.

In a preferred embodiment, both $R_1$ and $R_2$ are $C_{1-5}$ linear alkyl groups.

Optionally, the flavouring mixture can additionally comprise more esters of formula $R_1$—COO—$R_2$, for example the flavouring mixture can comprise three, four, five, six or more different esters selected from the compounds of formula $R_1$—COO—$R_2$.

In a preferred embodiment, the flavouring mixture comprises three esters of formula $R_1$—COO—$R_2$.

In another preferred embodiment, the flavouring mixture contains exactly three esters of formula $R_1$—COO—$R_2$, and does not contain an essential amount of any additional ester of formula $R_1$—COO—$R_2$. The term "essential" as used here and in the following in relation to the esters preferably means not more than 5 wt %, preferably not more than 3 wt % or 1 wt % and in particular not more than 0.5 wt %, especially 0 wt %, based on the total amount of said three esters.

The esters of formula $R_1$—COO—$R_2$ contained in the flavouring mixture of the present invention are preferably selected from the group consisting of ethyl acetate, n-propyl acetate, n-butyl acetate, methyl propionate, ethyl propionate, n-propyl propionate, n-butyl propionate, n-pentyl propionate, methyl butanoate, n-propyl butanoate, n-butyl butanoate, n-pentyl butanoate, methyl pentanoate, ethyl pentanoate, n-butyl pentanoate, methyl hexanoate, ethyl hexanoate, n-propyl hexanoate and n-butyl hexanoate; more preferably are selected from the group consisting of ethyl acetate, n-propyl acetate, methyl propionate, ethyl propionate, methyl butanoate, n-propyl butanoate, methyl pentanoate, ethyl pentanoate, methyl hexanoate, and ethyl hexanoate; and still more preferably are selected from the group consisting of ethyl acetate, methyl butanoate and methyl hexanoate.

In an embodiment of the invention, the flavouring mixture comprises three different esters selected from the group consisting of ethyl acetate, n-propyl acetate, n-butyl acetate, methyl propionate, ethyl propionate, n-propyl propionate, n-butyl propionate, n-pentyl propionate, methyl butanoate, n-propyl butanoate, n-butyl butanoate, n-pentyl butanoate, methyl pentanoate, ethyl pentanoate, n-butyl pentanoate, methyl hexanoate, ethyl hexanoate, n-propyl hexanoate and n-butyl hexanoate; more preferably selected from the group consisting of ethyl acetate, n-propyl acetate, methyl propionate, ethyl propionate, methyl butanoate, n-propyl butanoate, methyl pentanoate, ethyl pentanoate, methyl hexanoate, and ethyl hexanoate.

In a preferred embodiment, the flavouring mixture comprises the esters ethyl acetate, methyl butanoate and methyl hexanoate.

In another preferred embodiment, the flavouring mixture comprises the esters ethyl acetate, methyl butanoate and methyl hexanoate, and does not contain an essential amount of any additional ester of formula $R_1$—COO—$R_2$. The total proportion of esters of formula $R_1$—COO—$R_2$ in the flavouring mixture is generally comprised in the range 20-45%, preferably in the range 25-40%, more preferably in the range 30-35%, and still more preferably in the range 31-33%.

In a particularly preferred embodiment of the invention, the flavouring mixture comprises:
 ethyl acetate in a proportion comprised in the range 6-12%, preferably in the range 7-10%, and more preferably in the range 8-9%;
 methyl butanoate in a proportion comprised in the range 12-25%, preferably in the range 17-20%, and more preferably in the range 18.5-19.5%; and
 methyl hexanoate in a proportion comprised in the range 2-8%, preferably in the range 3-6%, and more preferably in the range 4-5%;
and preferably the flavouring mixture does not contain any additional ester of formula $R_1$—COO—$R_2$.

Ketones

The flavouring mixture according to the present invention comprises two or three ketones of formula $R_3$—CO—$R_4$, wherein $R_3$ and $R_4$ are $C_{1-5}$ linear alkyl groups.

Optionally, the flavouring mixture can additionally comprise more ketones of formula $R_3$—CO—$R_4$, for example the flavouring mixture can comprise three, four, five, six or more different ketones selected from the compounds of formula $R_3$—CO—$R_4$.

In an embodiment of the invention, the flavouring mixture comprises two ketones of formula $R_3$—CO—$R_4$ and does not contain an essential amount of any additional ketone of formula $R_3$—CO—$R_4$. The term "essential" as used here and in the following in relation to the ketones preferably means not more than 5 wt %, preferably not more than 3 wt % or 1 wt % and in particular not more than 0.5 wt %, especially 0 wt %, based on the total amount of said two ketones.

The ketones of formula $R_3$—CO—$R_4$ contained in the flavouring mixture of the present invention are preferably selected from the group consisting of 2-propanone, 2-butanone, 2-pentanone, 3-pentanone and 3-hexanone; more preferably are selected from the group consisting of 2-butanone, 2-pentanone and 3-hexanone.

In a preferred embodiment, the flavouring mixture comprises the ketones 2-butanone and 2-pentanone.

In another preferred embodiment, the flavouring mixture comprises the ketones 2-butanone and 2-pentanone and does not contain an essential amount of any additional ketone of formula $R_3$—CO—$R_4$.

The total proportion of ketones of formula $R_3$—CO—$R_4$ in the flavouring mixture is generally comprised in the range 5-18%, preferably in the range 7-15%, more preferably in the range 8-13%, and still more preferably in the range 10-12%.

In a particularly preferred embodiment of the invention, the flavouring mixture comprises:
  2-butanone in a proportion comprised in the range 4-12%, preferably in the range 6-10%, and more preferably in the range 7-8%;
  2-pentanone in a proportion comprised in the range 1-6%, preferably in the range 2-5%, and more preferably in the range 2.5-3.5%;
and preferably the flavouring mixture does not contain an essential amount of any additional ketone of formula $R_3$—CO—$R_4$.

Aldehydes

The flavouring mixture according to the present invention comprises two or three aldehydes of formula $R_5$—CHO, wherein $R_5$ is a $C_{2-9}$ linear alkyl group.

Optionally, the flavouring mixture can additionally comprise more aldehydes of formula $R_5$—CHO, for example the flavouring mixture can comprise three, four, five, six or more different aldehydes selected from the compounds of formula $R_5$—CHO.

In a preferred embodiment, the flavouring mixture comprises three aldehydes of formula $R_5$—CHO.

In another preferred embodiment, the flavouring mixture comprises three aldehydes of formula $R_5$—CHO, and does not contain an essential amount of any additional aldehyde of formula $R_5$—CHO. The term "essential" as used here and in the following in relation to the aldehydes preferably means not more than 5 wt %, preferably not more than 3 wt % or 1 wt % and in particular not more than 0.5 wt %, especially 0 wt %, based on the total amount of said three aldehydes.

The aldehydes of formula $R_5$—CHO contained in the flavouring mixture of the present invention are preferably selected from the group consisting of pentanal (i.e., $R_5$=n-butyl), hexanal (i.e., $R_5$=n-pentyl), heptanal (i.e., $R_5$=n-hexyl), octanal (i.e., $R_5$=n-heptyl), nonanal (i.e., $R_5$=n-octyl) and decanal (i.e., $R_5$=n-nonyl), more preferably are selected from the group consisting of pentanal, hexanal and heptanal.

In an embodiment of the invention, the flavouring mixture comprises three aldehydes selected from the group consisting of pentanal, hexanal, heptanal, octanal, nonanal and decanal.

In a preferred embodiment, the flavouring mixture comprises the aldehydes pentanal, hexanal and heptanal.

In another preferred embodiment, the flavouring mixture comprises the aldehydes pentanal, hexanal and heptanal, and does not contain an essential amount of any additional aldehyde of formula $R_5$—CHO.

The total proportion of aldehydes of formula $R_5$—CHO in the flavouring mixture is generally comprised in the range 40-75%, preferably in the range 45-70%, more preferably in the range 50-65%, and still more preferably in the range 56-59%.

In a particularly preferred embodiment of the invention, the flavouring mixture comprises:
  pentanal in a proportion comprised in the range 9-22%, preferably in the range 12-18%, and more preferably in the range 15-17%;
  hexanal in a proportion comprised in the range 30-45%, preferably in the range 35-40%, and more preferably in the range 37-39%; and
  heptanal in a proportion comprised in the range 1-8%, preferably in the range 2-5%, and more preferably in the range 3-4%;
and preferably the flavouring mixture does not contain an essential amount of any additional aldehyde of formula $R_5$—CHO.

In an embodiment of the invention, the flavouring mixture comprises:
  a) two esters of formula $R_1$—COO—$R_2$ in a proportion comprised in the range 20-45%, preferably in the range 25-40%, more preferably in the range 30-35%, and still more preferably in the range 31-33%;
  b) two ketones of formula $R_3$—CO—$R_4$ in a proportion comprised in the range 5-18%, preferably in the range 7-15%, more preferably in the range 8-13%, and still more preferably in the range 10-12%; and
  c) two aldehydes of formula $R_5$—CHO in a proportion comprised in the range 40-75%, preferably in the range 45-70%, more preferably in the range 50-65%, and still more preferably in the range 56-59%;
wherein $R_1$, $R_3$, and $R_4$ are $C_{1-5}$ linear alkyl groups; $R_2$ is a $C_{1-5}$ linear or branched alkyl group; and $R_5$ is a $C_{2-9}$ linear alkyl group; and
wherein the total of these percentages adds up to no more than 100% of the flavouring mixture, and preferably the total of these percentages adds up to the 100% of the flavouring mixture.

In an embodiment of the invention, the flavouring mixture comprises:
  a) three esters of formula $R_1$—COO—$R_2$ in a proportion comprised in the range 20-45%, preferably in the range 25-40%, more preferably in the range 30-35%, and still more preferably in the range 31-33%;
  b) two ketones of formula $R_3$—CO—$R_4$ in a proportion comprised in the range 5-18%, preferably in the range 7-15%, more preferably in the range 8-13%, and still more preferably in the range 10-12%; and
  c) three aldehydes of formula $R_5$—CHO in a proportion comprised in the range 40-75%, preferably in the range 45-70%, more preferably in the range 50-65%, and still more preferably in the range 56-59%;
wherein $R_1$, $R_3$, and $R_4$ are $C_{1-5}$ linear alkyl groups; $R_2$ is a $C_{1-5}$ linear or branched alkyl group; and $R_5$ is a $C_{2-9}$ linear alkyl group; and wherein the total of these percentages adds up to no more than 100% of the flavouring mixture, and preferably the total of these percentages adds up to the 100% of the flavouring mixture.

In an embodiment of the invention, the flavouring mixture comprises:
a) two esters selected from the group consisting of ethyl acetate, n-propyl acetate, n-butyl acetate, methyl propionate, ethyl propionate, n-propyl propionate, n-butyl propionate, n-pentyl propionate, methyl butanoate, n-propyl butanoate, n-butyl butanoate, n-pentyl butanoate, methyl pentanoate, ethyl pentanoate, n-butyl pentanoate, methyl hexanoate, ethyl hexanoate, n-propyl hexanoate and n-butyl hexanoate; preferably selected from the group consisting of ethyl acetate, n-propyl acetate, methyl propionate, ethyl propionate, methyl butanoate, n-propyl butanoate, methyl pentanoate, ethyl pentanoate, methyl hexanoate, and ethyl hexanoate; and more preferably selected from the group consisting of ethyl acetate, methyl butanoate and methyl hexanoate; in a proportion comprised in the range 20-45%, preferably in the range 25-40%, more preferably in the range 30-35%, and still more preferably in the range 31-33%;
b) two ketones selected from the group consisting of 2-propanone, 2-butanone, 2-pentanone, 3-pentanone and 3-hexanone; preferably selected from the group consisting of 2-butanone, 2-pentanone and 3-hexanone, and more preferably are 2-butanone and 2-pentanone; in a proportion comprised in the range 5-18%, preferably in the range 7-15%, more preferably in the range 8-13%, and still more preferably in the range 10-12%; and
c) two aldehydes selected from the group consisting of pentanal, hexanal, heptanal, octanal, nonanal and decanal, preferably selected from the group consisting of pentanal, hexanal and heptanal; in a proportion comprised in the range 40-75%, preferably in the range 45-70%, more preferably in the range 50-65%, and still more preferably in the range 56-59%;
wherein the total of these percentages adds up to no more than 100% of the flavouring mixture, and preferably the total of these percentages adds up to the 100% of the flavouring mixture.

In an embodiment of the invention, the flavouring mixture comprises:
a) three esters selected from the group consisting of ethyl acetate, n-propyl acetate, n-butyl acetate, methyl propionate, ethyl propionate, n-propyl propionate, n-butyl propionate, n-pentyl propionate, methyl butanoate, n-propyl butanoate, n-butyl butanoate, n-pentyl butanoate, methyl pentanoate, ethyl pentanoate, n-butyl pentanoate, methyl hexanoate, ethyl hexanoate, n-propyl hexanoate and n-butyl hexanoate; preferably selected from the group consisting of ethyl acetate, n-propyl acetate, methyl propionate, ethyl propionate, methyl butanoate, n-propyl butanoate, methyl pentanoate, ethyl pentanoate, methyl hexanoate, and ethyl hexanoate; and more preferably comprises ethyl acetate, methyl butanoate and methyl hexanoate; in a proportion comprised in the range 20-45%, preferably in the range 25-40%, more preferably in the range 30-35%, and still more preferably in the range 31-33%;
b) two ketones selected from the group consisting of 2-propanone, 2-butanone, 2-pentanone, 3-pentanone and 3-hexanone; preferably selected from the group consisting of 2-butanone, 2-pentanone and 3-hexanone; and more preferably are 2-butanone and 2-pentanone; in a proportion comprised in the range 5-18%, preferably in the range 7-15%, more preferably in the range 8-13%, and still more preferably in the range 10-12%; and
c) three aldehydes selected from the group consisting of pentanal, hexanal, heptanal, octanal, nonanal and decanal, preferably are pentanal, hexanal and heptanal; in a proportion comprised in the range 40-75%, preferably in the range 45-70%, more preferably in the range 50-65%, and still more preferably in the range 56-59%;
wherein the total of these percentages adds up to no more than 100% of the flavouring mixture, and preferably the total of these percentages adds up to the 100% of the flavouring mixture.

In an embodiment, the flavouring mixture comprises:
a) the esters ethyl acetate, methyl butanoate and methyl hexanoate;
b) the ketones 2-butanone and 3-pentanone; and
c) the aldehydes pentanal, hexanal and heptanal.

In a preferred embodiment, the flavouring mixture comprises:
a) the esters ethyl acetate, methyl butanoate and methyl hexanoate in a total proportion comprised in the range 20-45%, preferably in the range 25-40%, more preferably in the range 30-35%;
b) the ketones 2-butanone and 3-pentanone in a total in a proportion comprised in the range 5-18%, preferably in the range 7-15%, more preferably in the range 8-13%; and
c) the aldehydes pentanal, hexanal and heptanal in a total proportion comprised in the range 45-70%, more preferably in the range 50-65%;
wherein the total of these percentages adds up to no more than 100% of the flavouring mixture, preferably the total of these percentages adds up to the 100% of the flavouring mixture.

In a particularly preferred embodiment, the flavouring mixture comprises:
ethyl acetate in a proportion comprised in the range 6-12%, preferably in the range 7-10%, and more preferably in the range 8-9%;
methyl butanoate in a proportion comprised in the range 12-25%, preferably in the range 17-20%, and more preferably in the range 18.5-19.5%;
methyl hexanoate in a proportion comprised in the range 2-8%, preferably in the range 3-6%; and more preferably in the range 4-5%;
2-butanone in a proportion comprised in the range 4-12%, preferably in the range 6-10%, and more preferably in the range 7-8%;
2-pentanone in a proportion comprised in the range 1-6%, preferably in the range 2-5%, and more preferably in the range 2.5-3.5%;
pentanal in a proportion comprised in the range 9-22%, preferably in the range 12-18%, and more preferably in the range 15-17%;
hexanal in a proportion comprised in the range 30-45%, preferably in the range 35-40%, and more preferably in the range 37-39%; and
heptanal in a proportion comprised in the range 1-8%, preferably in the range 2-5%, and more preferably in the range 3-4%;
wherein the total of these percentages adds up to no more than 100% of the flavouring mixture, preferably the total of these percentages adds up to the 100% of the flavouring mixture.

In another particularly preferred embodiment of the invention, the flavouring mixture essentially consists of:
- ethyl acetate in a proportion comprised in the range 6-12%, preferably in the range 7-10%, and more preferably in the range 8-9%;
- methyl butanoate in a proportion comprised in the range 12-25%, preferably in the range 17-20%, and more preferably in the range 18.5-19.5%;
- methyl hexanoate in a proportion comprised in the range 2-8%, preferably in the range 3-6%, and more preferably in the range 4-5%;
- 2-butanone in a proportion comprised in the range 4-12%, preferably in the range 6-10%, and more preferably in the range 7-8%;
- 2-pentanone in a proportion comprised in the range 1-6%, preferably in the range 2-5%, and more preferably in the range 2.5-3.5%;
- pentanal in a proportion comprised in the range 9-22%, preferably in the range 12-18%, and more preferably in the range 15-17%;
- hexanal in a proportion comprised in the range 30-45%, preferably in the range 35-40%, and more preferably in the range 37-39%; and
- heptanal in a proportion comprised in the range 1-8%, preferably in the range 2-5%, and more preferably in the range 3-4%;

wherein the total of these percentages adds up to the 100% of the flavouring mixture.

Use of the Flavouring Mixture

The flavouring mixture of the present invention can be used as a flavouring additive in animal feed compositions, typically in livestock feed, more particularly in swine and cattle feed, and especially in swine and cattle creep feed.

The flavouring mixture is added to the feed compositions in a proportion generally comprised between 1 and 10 ppm, preferably comprised between 1.5 and 6 ppm, more preferably comprised between 2 and 4 ppm, and still more preferably comprised between 2.5 and 3.5 ppm.

The flavouring mixture is usually added to the feed compositions in diluted form, i.e. the flavouring mixture is diluted in a solvent. In this way, the flavouring mixture can be added to the feed compositions more conveniently, to ensure its homogeneous distribution throughout the feed.

Therefore, another aspect of the present invention is a liquid flavouring composition comprising (or consisting of) the above described flavouring mixture and a solvent.

Said liquid flavouring composition generally comprise from 0.5% to 5.0%, preferably from 1.0% to 3.0%, more preferably from 1.5% to 2.0%, and still more preferably from 1.6% to 1.8% of the flavouring mixture, and the remainder of the composition up to 100% consists of solvent, i.e., the liquid flavouring composition generally contains from 95.0% to 99.5%, preferably from 97.0% to 99.0%, more preferably from 98.0% to 98.5%, and still more preferably from 98.2% to 98.4% of solvent.

The solvents suitable to be used for diluting the flavouring mixture of the present invention are, for example, propylene glycol, glycerine, triacetin, or mixtures thereof. A preferred solvent is propylene glycol.

The skilled in the art will know how to adjust the proportion of this diluted liquid flavouring composition in the feed in order to achieve the required proportion of the flavouring mixture, according to the proportion of the flavouring mixture in the diluted composition.

The liquid flavouring composition comprising the flavouring mixture can be added to the feed, for example, by spraying it onto the feed.

Alternatively, to further facilitate the homogeneous distribution of the flavour in the feed, the flavour mixture can be incorporated in solid form to the feed. Thus, for example, the diluted liquid flavour composition is first absorbed onto a suitable inert solid carrier to obtain a solid flavour composition comprising the flavour mixture.

Therefore, another aspect of the invention is a solid flavouring composition comprising the flavouring mixture and an inert solid carrier.

The inert solid carrier is a solid substance, typically having high porosity, which is able to absorb liquid substances.

For example, a suitable solid base is precipitated hydrated silicon dioxide.

The solid flavour composition can be conveniently prepared by mixing the diluted liquid flavour composition and the inert solid carrier.

The weight proportion of the liquid flavour composition relative to the inert solid carrier is generally comprised in the range 2:1 to 1:2.

In a preferred embodiment, the solid flavour contains about 50% of the diluted liquid flavour composition and about 50% of the inert solid carrier.

When the flavour is added in solid form to the feed, those skilled in the art will know how to calculate the amount of solid flavour to be added to prepare a flavoured feed containing the required proportion of the flavouring mixture, depending on the concentration of the diluted liquid flavouring composition and on the proportion of it in the solid flavour composition.

The results of an efficacy assay (included in the examples section below) performed in suckling piglets fed with a creep feed flavoured with a flavouring mixture according to the present invention show that, surprisingly, the young lactating animals fed therewith have improved performance comparatively to those fed with a non-flavoured feed, thus the piglets fed with the flavoured feed have less variability in their body weight within a litter at weaning, and they also showed an increased average daily gain of weight and a reduction in the mortality rate.

Therefore, another aspect of the invention is an animal feed comprising the flavouring mixture of the invention.

In a preferred embodiment, the animal feed is a creep feed. Creep feed is a solid animal feed specifically to be given to young animals, when they are still in the lactating period, to supplement their diet.

In a preferred embodiment, the animal feed is animal feed for livestock, preferably for swine or for cattle.

In a particularly preferred embodiment, the animal feed comprising the flavouring mixture is a creep feed for swine or a creep feed for cattle.

The animal feed suitable to be flavoured with the flavouring mixture of the present invention can be any kind of animal feed, whose possible compositions are well known to the skilled in the art, designed according to the nutrition requirements of the specific animals and the specific age period.

For example, a feed for piglets typically contains cereals, such as corn, wheat, soybeans, barley or oats; different protein sources, such as fishmeal, soybean meal or animal plasma, for example; aminoacids, such as methionine, threonine, valine, tryptophan, arginine, histidine or leucine; as well as vitamins and minerals to meet the requirements for growth of piglets (U.S. National Research Council, NRC, 2012).

The flavouring mixture is added to the feed compositions in a proportion generally comprised between 1 and 10 ppm, preferably comprised between 1.5 and 6 ppm, more preferably comprised between 2 and 4 ppm, and still more preferably comprised between 2.5 and 3.5 ppm.

Another aspect of the invention is a flavouring mixture as described above, wherein the flavouring mixture is an artificial mixture. Artificial mixture means that the flavouring mixture is not solely obtained from natural sources, for example by means of extraction processes.

Another aspect of the invention is the use of the flavouring mixture for flavouring animal feed compositions.

In a preferred embodiment, the animal feed is a creep feed.

In a preferred embodiment, the animal feed is animal feed for livestock, preferably for swine or for cattle.

In a particularly preferred embodiment, the animal feed is a creep feed for swine or a creep feed for cattle.

Another aspect of the invention is a method of flavouring animal feed compositions, wherein the flavouring mixture as described above is added to animal feed compositions.

EXAMPLES

Example 1: Liquid Flavouring Composition

A diluted liquid flavouring composition was prepared using propylene glycol as solvent, according to the composition described in Table I.

TABLE I

| Component | % weight |
| --- | --- |
| Methyl butanoate | 0.3207 |
| Methyl hexanoate | 0.0799 |
| Ethyl acetate | 0.1377 |
| 2-butanone | 0.1299 |
| 2-pentanone | 0.0456 |
| Pentanal | 0.2737 |
| Hexanal | 0.6433 |
| Heptanal | 0.0591 |
| Propylene glycol | 98.2101 |
| Total | 100.0000 |

All the components were commercially available, and the composition was prepared by mixing all the ingredients.

This flavouring composition contained 1.69% by weight of the flavouring mixture consisting of ethyl acetate, methyl butanoate, methyl hexanoate, 2-butanone, 3-pentanone, pentanal, hexanal and heptanal; and 98.31% by weight of solvent (propylene glycol).

Example 2: Solid Flavouring Composition

A solid flavouring composition was prepared by mixing the liquid composition of Example 1 with precipitated silicon dioxide (IQESIL, S.A.) in a proportion of 50% by weight of each.

Thus, to prepare a batch of 200 kg of the solid flavour, 100 kg of the liquid flavouring composition of Example 1 were sprayed onto 100 kg of precipitated silicon dioxide in a convective horizontal mixer, and the blend was thoroughly mixed during approximately 10 minutes until obtaining a homogeneous mixture.

Example 3: Flavoured Feed Product

A flavoured feed product was prepared, with the basis of a common non-flavoured feed composition, as specified in Table II.

TABLE II

| Ingredients | % weight |
| --- | --- |
| Wheat | 33.11 |
| Corn | 14.53 |
| Extruded soybeans | 13.00 |
| Barley | 13.00 |
| Sweet milk whey | 10.00 |
| Fishmeal | 6.00 |
| Soybean meal 44% CP | 5.00 |
| Animal plasma | 2.34 |
| Soybean oil | 0.93 |
| Mono calcium phosphate | 0.530 |
| L-Lysine HCl | 0.440 |
| Vitamin-Mineral premix | 0.400 |
| DL-Methionin | 0.240 |
| L-Threonin | 0.210 |
| L-Valine | 0.130 |
| L-Triptophan | 0.080 |
| Salt | 0.060 |

The flavoured feed was prepared by adding 350 ppm of the solid flavour of Example 2 to the feed product of Table II, and thoroughly mixing to ensure an homogeneous distribution of the feed additive.

The flavoured feed thus prepared contained 2.96 ppm of the flavouring mixture consisting of ethyl acetate, methyl butanoate, methyl hexanoate, 2-butanone, 3-pentanone, pentanal, hexanal and heptanal in the proportions specified in Example 1.

Efficacy Assay

To assess the efficacy of the flavouring mixture of the invention for flavouring animal feed, an experimental study was designed using the flavoured food of Example 3 as a creep feed diet for suckling swine, and its effect on the piglet performance was evaluated.

The following two treatments were used:
The flavoured feed product of Example 3 (Treatment 2, T2)
A non-flavoured feed as comparative reference (Treatment 1, T1), having the composition disclosed in Table II i.e., the same composition as the feed of Example 3 but without the flavouring mixture.

The study was carried out at the maternal unit of a farm with a breeding stock of 400 sows (Landrace×Large White). Sows were individually housed in commercial farrowing cages within a room with forced ventilation and completely slatted floors. Each cage was equipped with two nipples water drinkers one for the sow and other for piglets; a commercial trough for the sow and one mini hopper pan (Rotecna, Spain) for piglets were added to ensure ad libitum feeding of creep-feed.

The trial was conducted with one batch of sows and their litters during the entire lactating period, namely from Day 2 to Day 28 post-farrowing day, and each suckling piglet was individually monitored. Creep feed was offered ad libitum for the entire period, until weaning (28 days).

A total of 23 litters of commercial crossing piglets ([Large White×Landrace]×Pietrain) were used in the present study. Each experimental treatment was offered to 11 litters for T1 and 12 litters for T2, previously homogenized at cross-fostering (maximum 48 h after birth) by number of piglets by litter, piglet body weight (BW) and coefficient of variation (CV %) of the BW within the litter. Plastic ear tag identification with the animal's number was used as piglet individual identification.

Creep feed disappearance was measured as a total creep feed consumed per litter from its introduction (day 2 after birth) until weaning.

Individual weight of the animals (BW) were also registered on days 2, 7, 14, 21 and 28 in order to calculate the coefficient of variation of the litters (CV) and the average daily gain of weight (ADG).

The health status of sows and their litters were regularly assessed.

The results obtained for both treatments T1 and T2 are shown in Table III, where the following data is included: sows' parity number, the initial number of piglets per litter and their mortality during the suckling period, the growth performance of piglets (BW, CV and ADG) and feed disappearance.

TABLE III

| Item | Treatment | |
|---|---|---|
| | T1 | T2 |
| Num. of sows | 11 | 12 |
| Parity | 4.53 | 5.16 |
| Num. initial piglets | 12.0 | 12.0 |
| Mortality, % | 6.90* | 3.01* |
| BW0, g | 1570.3 | 1528.1 |
| BW7, g | 2607.6 | 2628.8 |
| BW14, g | 3829.8 | 3981.4 |
| BW21, g | 5242.5 | 5679.3 |
| BW28, g | 6542.0 | 6972.3 |
| CV0 | 0.16 | 0.17 |
| CV7 | 0.22 | 0.21 |
| CV14 | 0.27 | 0.19 |
| CV21 | 0.25* | 0.16* |
| CV28 | 0.26* | 0.17* |
| ADG 0-7, g/d | 148.48 | 163.08 |
| ADG 7-14, g/d | 200.03 | 223.39 |
| ADG 14-21, g/d | 196.58* | 242.56* |
| ADG 21-28, g/d | 207.97 | 212.19 |
| ADG 0-28, g/d | 196.6 | 214.1 |
| Feed disap. 0-7, g | 25.56 | 23.25 |
| Feed disap. 7-14, g | 156.10 | 289.10 |
| Feed disap. 14-21, g | 614.43 | 808.04 |
| Feed disap. 21-28, g | 870.99 | 670.57 |
| Feed disap. 0-28, g | 1652.0 | 1719.4 |

The results are presented as Least Square Means taking into account Tukey adjust and the alpha level (0.05) is used for the determination of significance. An asterisk (*) means that the difference observed between T1 and T2 values are statistically significant. The statistical package SAS® was used for the statistical analysis of the results.

Higher piglet mortality was observed in T1 litters than in T2.

In relation to growth performance, animals in T2 showed quantitatively higher BW (P<0.15) than T1 (control) on day 21 and 28 of lactation. Significantly higher ADG was also observed for those animals fed T2 diet than those fed T1 from 14 to 21 days of lactation (P=0.014).

At the start of the trial, coefficient of variation of the body weight (CV) was approximately the same for each treatment. However, a tendency to have less CV within each litter was observed (P<0.10) for T2 than for the control animals on Day 14. On Day 21 and 28, significantly lower CV (P<0.05) was observed for piglets fed the T2 than those fed the T1 diet.

No significant differences were observed in the creep feed disappearance among litters likely due to the high variability observed. Feed disappearance may include the intake of piglets and feed waste. Then, this parameter is less accurate than the growth of piglets.

Therefore, the results shown in Table III confirmed that, surprisingly, the incorporation the flavouring mixture of the invention in the creep feed reduced the variability in the piglet body weight within the litters obtaining higher homogeneity of piglet weights at weaning. Moreover, the use of the flavouring mixture also gives rise to an increase in the animal average daily gain and a reduction in the mortality rate.

The results obtained in the study were further analysed to assess the different response of the animals to the treatments depending on their growth performance (big or small).

In Table IV are presented the growth performance results of the piglets when the statistical analysis was performed considering an ADG (average daily gain of weight) block inside each treatment to differentiate the experimental treatment effects on the growth response of big and small piglets.

The ADG block was calculated by the ADG at 28 days, piglets with lower growth than 180 g/day were categorized as small (S) while animals having a growth of 180 g/day or higher were categorized as big (B).

The results show that T2 treatment promoted a higher body weight (BW) and average daily gain of weight (ADG) (P<0.0001) in those animals with a lower gain of weight in each treatment.

TABLE IV

| | Treatment | | | |
|---|---|---|---|---|
| | T1 | | T2 | |
| Item | B | S | B | S |
| Body weight (g) | | | | |
| BW0 | 1663.5 | 1553.8 | 1605.0 | 1514,8 |
| BW7 | 2938.5 | 2267.2 | 2874.9 | 2308.6 |
| BW14 | 4525.6 | 2987.6 | 4326.7 | 3397.8 |
| BW21 | 6085.9 | 4129.1* | 6118.8 | 4770.4* |
| BW28 | 7880.5 | 4690.5* | 7578.3 | 5585.8* |
| Average daily gain of weight (g/d) | | | | |
| ADG 0-7 | 188.57 | 95.53 | 190.02 | 108.63 |
| ADG 7-14 | 264.51 | 118.30* | 241.98 | 169.69* |
| ADG 14-21 | 222.91 | 153.06 | 256.02 | 187.22 |
| ADG 21-28 | 299.08* | 86.42 | 243.25* | 135.91 |
| ADG 0-28 | 241.91 | 119.05* | 233.68 | 153.53* |

Surprisingly, the results indicated that the flavour supplementation particularly allowed an increase in the body weight gain of the smallest piglets. This result could explain the raised homogeneity found within the litters.

The higher body weight gain of piglets consuming the flavoured creep feed may not be completely explained by the differences observed in creep-feed disappearance. Therefore, without being bound to any theory, the results may indicate that the higher body weight could be caused by "activated" piglets towards higher milk consumption in suckling period. The raise in sows' milk production could be explained by higher stimulation of the udder by those piglets that could establish a positive reward between the flavour contained in feed and mother's milk.

The invention claimed is:
1. A method for flavouring animal creep feed, the method comprising
   adding between 1-10 ppm of a composition to the creep feed, wherein the composition comprises:
   (i) 7-10% ethyl acetate, 17-20% methyl butanoate and 3-6% methyl hexanoate, and does not contain an essential amount of any additional ester of formula $R_1$—COO—$R_2$;

(ii) 6-10% 2-butanone and 2-5% 2-pentanone and does not contain an essential amount of any additional ketone of formula $R_3$—CO—$R_4$; and (iii) 12-18% pentanal, 35-40% hexanal and 2-5% heptanal, and does not contain an essential amount of any additional aldehyde of formula $R_5$—CHO;

wherein the percentages are expressed by weight, and wherein the total of these percentages adds up to no more than 100% of the composition wherein animals fed with creep feed flavoured according to said method have improved growth compared to animals which are given creep feed without the flavouring composition.

2. The method according to claim 1, wherein the composition is an artificial mixture.

3. The method according to claim 1, wherein the composition is a liquid flavouring composition further comprising a solvent.

4. The method according to claim 1, wherein the composition is a solid flavouring composition further comprising an inert solid carrier.

5. The method according to claim 1, wherein the animal creep feed is creep feed for swine or cattle.

\* \* \* \* \*